United States Patent
Borochoff et al.

(10) Patent No.: US 12,248,515 B2
(45) Date of Patent: Mar. 11, 2025

(54) RESOURCE DEPENDENCY SYSTEM AND GRAPHICAL USER INTERFACE

(71) Applicant: Palantir Technologies Inc., Denver, CO (US)

(72) Inventors: Adam Borochoff, New York, NY (US); Joseph Rafidi, Mountain View, CA (US); Parvathy Menon, San Jose, CA (US)

(73) Assignee: Palantir Technologies Inc., Denver, CO (US)

(*) Notice: Subject to any disclaimer, the term of this patent is extended or adjusted under 35 U.S.C. 154(b) by 290 days.

(21) Appl. No.: 18/085,150

(22) Filed: Dec. 20, 2022

(65) Prior Publication Data
US 2023/0122210 A1  Apr. 20, 2023

Related U.S. Application Data

(63) Continuation of application No. 17/315,750, filed on May 10, 2021, now Pat. No. 11,562,025, which is a
(Continued)

(51) Int. Cl.
| | |
|---|---|
| *G06F 16/901* | (2019.01) |
| *G06F 3/04847* | (2022.01) |
| *G06F 9/50* | (2006.01) |
| *G06F 16/16* | (2019.01) |
| *G06F 16/17* | (2019.01) |

(52) U.S. Cl.
CPC ...... *G06F 16/9024* (2019.01); *G06F 3/04847* (2013.01); *G06F 9/5011* (2013.01); *G06F 16/168* (2019.01); *G06F 16/173* (2019.01); *G06F 2203/04806* (2013.01)

(58) Field of Classification Search
None
See application file for complete search history.

(56) References Cited

U.S. PATENT DOCUMENTS

| | | | |
|---|---|---|---|
| 8,624,898 B1* | 1/2014 | Bugaj | G06T 13/00 345/473 |
| 9,881,066 B1* | 1/2018 | Yousaf | G06F 3/0482 |

(Continued)

*Primary Examiner* — Howard Cortes
(74) *Attorney, Agent, or Firm* — Knobbe, Martens, Olson & Bear, LLP

(57) ABSTRACT

A resource dependency system displays two dynamically interactive interfaces in a resource dependency user interface, a hierarchical resource repository and a dependency graph user interface. User interactions on each interface can dynamically update either interface. For example, a selection of a particular resource in the dependency graph user interface causes the system to update the dependency graph user interface to indicate the selection and also updates the hierarchical resource repository to navigate to the appropriate folder corresponding to the stored location of the selected resource. In another example, a selection of a particular resource in the hierarchical resource repository causes the system to update the hierarchical resource repository to indicate the selection and also updates the dependency graph user interface to display an updated graph, indicate the selection and, in some embodiments, focus on the selected resource by zooming into a portion of the graph.

20 Claims, 9 Drawing Sheets

Related U.S. Application Data continuation of application No. 16/276,447, filed on Feb. 14, 2019, now Pat. No. 11,030,248.

(60) Provisional application No. 62/659,362, filed on Apr. 18, 2018.

(56) References Cited

U.S. PATENT DOCUMENTS

| | | | |
|---|---|---|---|
| 10,228,834 B2* | 3/2019 | Kim | G06F 3/04845 |
| 11,030,248 B2 | 6/2021 | Borochoff et al. | |
| 11,308,128 B2* | 4/2022 | Gerstl | G06F 16/282 |
| 11,562,025 B2 | 1/2023 | Borochoff et al. | |
| 2003/0105771 A1* | 6/2003 | Tiefenbrun | G06F 16/168 |
| 2006/0242122 A1* | 10/2006 | DeVorchik | G06F 16/148 |
| 2009/0007127 A1* | 1/2009 | Roberts | G06F 9/5066 |
| | | | 718/104 |
| 2009/0327904 A1* | 12/2009 | Guzak | G06F 16/1834 |
| | | | 715/738 |
| 2012/0066210 A1* | 3/2012 | Mukerjee | G06F 16/3334 |
| | | | 707/723 |
| 2015/0186478 A1* | 7/2015 | Yan | G06F 16/14 |
| | | | 707/722 |
| 2017/0039253 A1* | 2/2017 | Bond | G06F 16/9024 |
| 2017/0195183 A1* | 7/2017 | Gershaft | H04L 41/22 |
| 2018/0067932 A1* | 3/2018 | Paterson | G06F 16/287 |
| 2018/0129401 A1* | 5/2018 | Kim | G06F 3/0482 |
| 2018/0136983 A1* | 5/2018 | Bequet | H04L 67/10 |
| 2018/0267989 A1* | 9/2018 | von Muhlen | H04L 67/10 |

\* cited by examiner

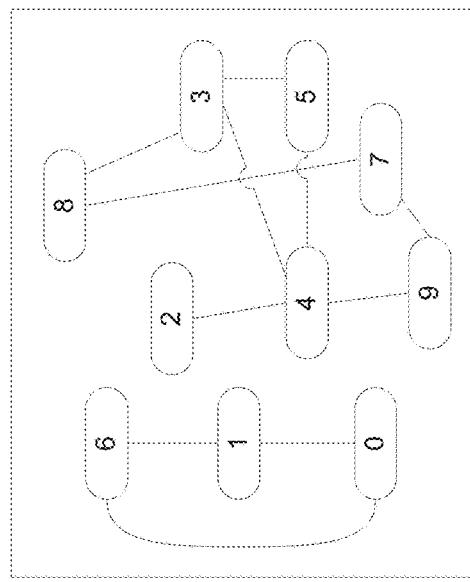

904 Example Clusters

903 Example Adjacency List

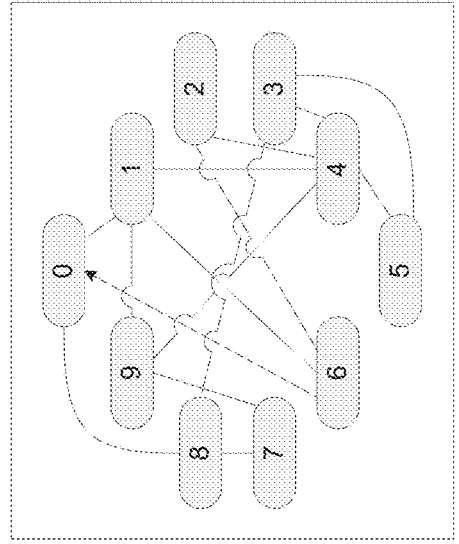

901 Example Simple Undirected Graph Data Structure

902 Example Adjacency Matrix

Graph data structure is purposefully built to handle high volume, highly connected data:
- More efficient in computing relationship queries than traditional databases, either using adjacency matrices, or adjacency lists
- Can easily add to the existing structure without endangering current functionality
  - Structure and schema of a graph model can easily flex
  - New data type and its relationship
- Evolve in step with the rest of the application and any changing business data requirements
- Can easily add weights to edges
- Use optimal amount of computer memory

FIG. 9

RESOURCE DEPENDENCY SYSTEM AND GRAPHICAL USER INTERFACE

RELATED APPLICATIONS

This application is a continuation of U.S. patent application Ser. No. 17/315,750, filed May 10, 2021, which is a continuation of U.S. patent application Ser. No. 16/276,447, filed on Feb. 14, 2019, which application claims the benefit of U.S. Patent Provisional Application No. 62/659,362, filed Apr. 18, 2018, the entire contents of which are hereby expressly incorporated by reference herein in their entirety and for all purposes. In addition, any and all applications for which a foreign or domestic priority claim is identified in the application data sheet as filed with the present application are also expressly incorporated by reference.

TECHNICAL FIELD

The present disclosure relates to systems and techniques for data integration, analysis, and visualization. More specifically, the present disclosure relates to interactive graphs including resource dependency relationships.

BACKGROUND

Efficient storage and retrieval of digital data and information is the focus of much commercial and academic attention. One way of retrieving resources (e.g., data sets or files) is with hierarchical navigation, where users move down a virtual folder hierarchy (i.e., nested folders) until they reach the folder in which a target resource is stored. Another way of retrieving resources is with query-based searching, where users first generate a query specifying one or more properties of a target resource (e.g., a word it contains), and then the user selects the relevant resource when the search engine returns a set of results, typically returned in a list. Hierarchical navigation and query-based searching can be slow and inefficient, and occasionally impractical to use. Moreover, as data is transformed, modified, and/or combined into new data sets, it is increasingly difficult to keep track of the original basis of each portion of the data. For example, within a data pipeline system, data is initially imported as "raw data." However, to users of the data pipeline system that are familiar with the imported data, the imported data is not "raw" at all, but rather went through a number of transformations even before entering the data pipeline system. Moreover, once a data set has been generated in the data pipeline system, a user may be interested in searching for or discovering the number of user interfaces that use the generated data set, such as user interfaces using the data set that have more than 300 users.

Hierarchical navigation is dependent on a virtual folder structure. Thus, computer users can view and interact with items inside these folders. However, folders conceal information about the resources, reducing the chances of opportunistic encounters with critical resources. Also, categorization of one resource can be difficult because items may relate to multiple folders. Most importantly, folders and the resource locations force users to remember the path to a specific resource. Searching allows users to retrieve resources using one or more attributes, such as a word the resource contains, date last modified, date created, partial resource name, etc. However, even with search, a user must come up with search terms or criteria to locate relevant resources, also reducing the likelihood of finding the correct resource (e.g. if multiple duplicates exist), and also reducing the chances of opportunistic encounters with critical resources, similar to hierarchical navigation. Finally, neither hierarchical navigation nor searching can be used to reliably and efficiently verify data dependencies within particular resources.

SUMMARY

The systems, methods, and devices described herein each have several aspects, no single one of which is solely responsible for its desirable attributes. Without limiting the scope of this disclosure, several non-limiting features will now be discussed briefly.

Retrieving resources based on resource and or data dependencies can provide noticeable benefits for retrieval of digital data. In the context of a data pipeline system where data and/or resources are dependent on one another or based on one another, it would be more efficient for a user to track the dependencies instead of particular resource location(s). Also, in some embodiments, multiple resource-retrieval solutions can be implemented. For example, the hierarchical navigation, query-based searching, and dependency-based navigation can all be used in the same system. Further, in some embodiments, it may be possible to determine dependencies based on the metadata or content of the resources. In some embodiments, it may be difficult or impossible to accurately determine resource dependencies from the resources themselves. It should be appreciated that a resource can comprise one or more relationships to other resources, through dependencies. It should also be appreciated that particular data sets (e.g., software code, a column in an excel sheet, or the like) can comprise one or more relationships to other data sets and/or resources as well. Such relationships can be based on parental dependencies (i.e., the data or resources the present resource depends on) or child dependencies (i.e., the data or resources that depend on the present resource).

Additionally, in some embodiments, the system can perform analytical tools to determine data dependency. These dependencies can be represented by a directed graph showing relationships and hierarchies between relevant or related data or resources. Also, in some embodiments, dependencies can also encompass relationships based data transformations, or data that has been modified from an original source.

Thus, in some embodiments, a resource dependency system can display two dynamically interactive interfaces in a resource dependency user interface, a hierarchical resource repository and a dependency graph user interface. User interactions on each interface can dynamically update either interface. For example, a selection of a particular resource in the dependency graph user interface causes the system to update the dependency graph user interface to indicate the selection and also updates the hierarchical resource repository to navigate to the appropriate folder corresponding to the stored location of the selected resource. In another example, a selection of a particular resource in the hierarchical resource repository causes the system to update the hierarchical resource repository to indicate the selection and also updates the dependency graph user interface to display an updated graph, indicate the selection and, in some embodiments, focus on the selected resource by zooming into a portion of the graph.

In some embodiments, a user can select a particular data set or resource on a graph, and the system can display a number of options in the interface (e.g., as a pop-up window, or the like) on how to interact with the resource. The options can include, but are not limited to, the ability to view more detailed information about the selected data set, edit metadata associated with the data set, modify listed dependencies, and/or perform additional filtering, for example by textual searching. For instance, if a user enters and applies a textual search, in some embodiments, the graph can update to show the filtered items satisfying the entered search. Another example of searching is allowing a user to search for data sets based on certain criteria, such as user interfaces that use the data set and have over a certain number of users; yet again, the search results can be shown in an updated graph.

In some embodiments, the system can display a graph encompassing two types of dependencies or transformations. A first type of dependency is related to transformations and relationships within the system itself. These relationships can be monitored or tracked as they occur or after the transformations have occurred and the relationships can be stored in the system to be used in rendering a graph. A second type of dependency is related to transformations and relationships external to the system. These relationships and transformations can be received by an external system or determined internally based on metadata and/or a comparison between the resources (e.g., files or data sets). In some embodiments, the second dependencies can be based at least partly on pre-processing steps performed by a third party prior to transmission of the data to the system. Further it should be appreciated, that in some embodiments, the graph is displayed in a user interface adjacent to or near a resource folder navigation system user interface. Interactions in one interface can affect the other. For example, a user selecting an item in the graph can update the folder to where the selected item is stored.

Additionally, some organizations may implement database protocols, data creation and/or maintenance protocols, and/or any relevant best practices for how to organize and configure various resources and/or sets of data in a database. Thus, having a resource-retrieval system based on dependencies can further aid in verifying whether a particular resource is adhering to any particular relevant protocol(s). For example, if a resource comprises the correct content and is otherwise stored in a correct resource location, it may still comprise data that depends on another resource that is incorrect or improper. For example, the resource, which may depend on a duplicate resource of the intended resource, as of one date, may appear to be correct. However, once the intended resource is updated, the duplicate resource may not receive the same updates, and the out-of-date information would still be propagated to the original resource without any critical updates.

Thus, in some embodiments, even as data is transformed, modified, and/or combined into new data structures and beyond recognition, the dependency-based navigation structure allows users to constantly maintain and verify the data as it is being used.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of resource dependency, or data transformation, relationships and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, a system or method of dynamically generating an interactive dependency-based user interface can comprise: generate a folder navigation user interface comprising a first item located at a first folder path; determine a first set of items dependent on the first item; determine a second set of items the first item depends on; generate a graph user interface comprising: the first item, wherein the appearance of the first item is differentiated from any of the items in the first or second set of items; the first set of items, wherein the first set of items appears on a first side of the first item; and the second set of items, wherein the second set of items appears on a second side of the first item; receive a selection of a second item from the first set of items or the second set of items; and update the folder navigation to display a second folder path. In some embodiments, the system or method can also include a graph user interface comprises a directed graph, a first folder path and second folder path that are different at least in part, a graph user interface configured to receive instructions to interact with and modify the view area of the graph, a graph user interface further configured to receive a selection of the first item, the second folder path comprising the second item, the second folder path is different from the first folder path, and/or a graph user interface displaying for each of the displayed items one or more of: an identifier, a file name, a folder, a folder path, or an origin of data.

In some embodiments, the system or method can further comprise: determine an updated first set of items dependent on the second item; determine an updated second set of items the second item depends on; update the graph user interface to comprise: the second item, wherein the appearance of the second item is differentiated from any of the items in the updated first or updated second set of items; the first set of items, wherein the first set of items appears on a first side of the second item; and the second set of items, wherein the second set of items appears on a second side of the second item.

In some embodiments, the system or method can further comprise: receive preprocessing information; upon receiving the preprocessing information, update the graph user interface to display one or more items based at least partly on the preprocessing information. In some embodiments, the system or method can also include preprocessing information that is determined by analyzing information prepared by an external database In some embodiments, the system or method can further comprise: determine a third item, wherein: the third item depends on one or more items from the second set of items, the one or more items from the first set of items depends from the third item, the third item has one or more dependency relationships to items that are not in the first or second sets of items, and the third item has no dependency relationship to the second item. In some embodiments, the system or method can further comprise: upon receiving the selection of the second item, update the graph user interface to zoom into the area comprising the second item, at least one item from the first set of items, and at least one item from the second set of items.

In some embodiments, the system or method can further comprise: monitor item dependencies and changes to the item dependencies; store information based at least in part on the monitoring in a database; update the graph user interface to display one or more items based at least partly on the stored data.

In some embodiments, the system or method can further comprise: receive search criteria comprising information about user interfaces that use a data set; determine results associated at least partly on the search criteria; and update the graph user interface to comprise at least a portion of the determined results.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 9 illustrates examples of graphs and processes associated with storing graph information, according to various embodiments of the present disclosure.

DETAILED DESCRIPTION

Overview

Figure 1:
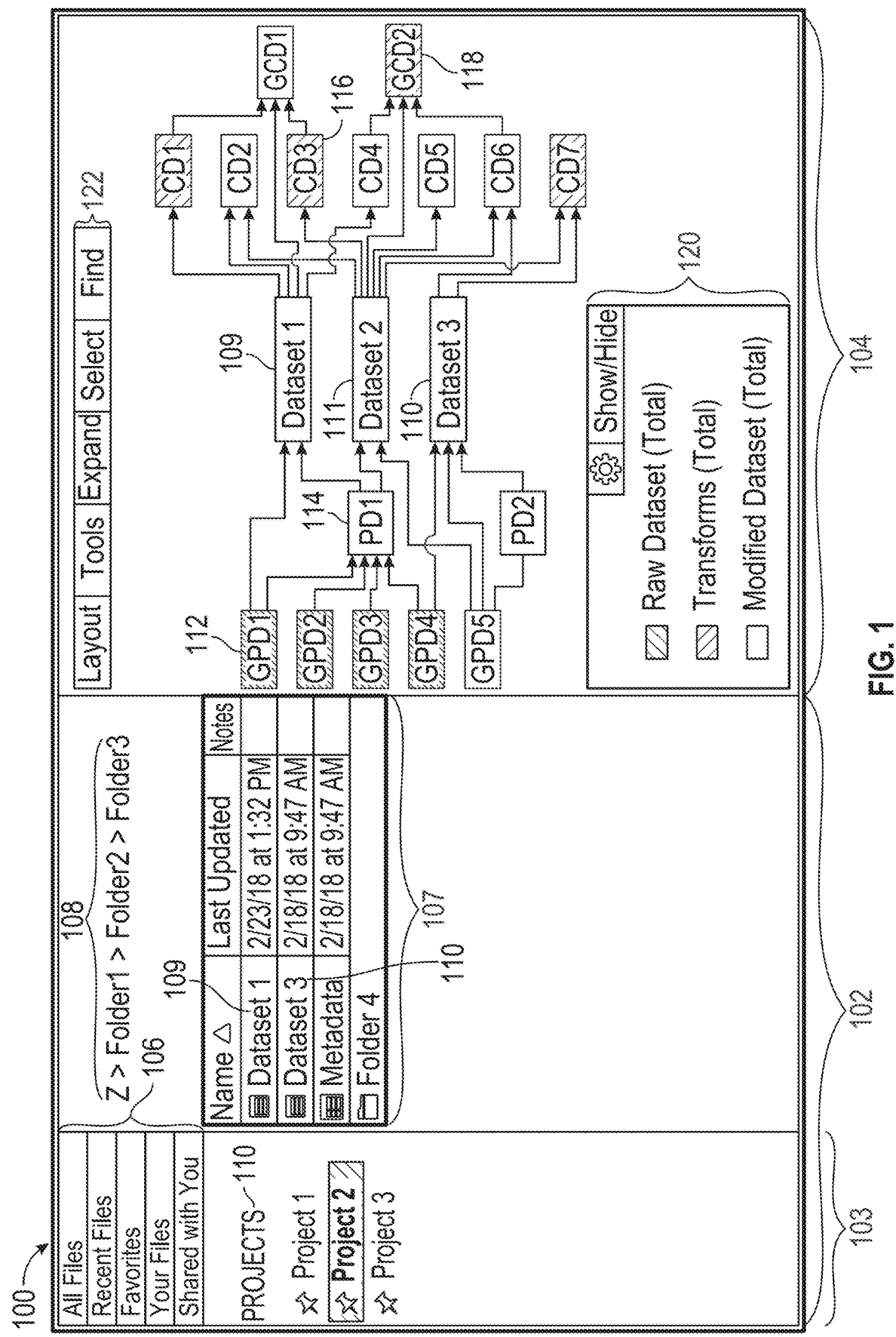
FIG. 1 illustrates an example resource dependency user interface of a resource dependency system, including a hierarchical resource repository and a dependency graph user interface, according to various embodiments of the present disclosure.

Retrieving resources based on resource and or data dependencies can provide noticeable benefits for retrieval of digital data. In the context of a data pipeline system where data and/or resources are dependent on one another or based on one another, there may be efficiency gains in enabling a user to track dependencies instead of (or in addition to) providing particular resource location(s). Also, in some embodiments, multiple resource-retrieval solutions can be implemented. For example, the hierarchical navigation, query-based searching, and dependency-based navigation can all be used in the same system. Further, in some embodiments, it may be possible to determine dependencies based on the metadata or content of the resources. In some embodiments, it may be difficult or impossible to accurately determine resource dependencies from the resources themselves. A resource can have one or more relationships with other resources, through dependencies. Data sets can have one or more relationships with other data sets and/or resources. Such relationships can be based on parental dependencies (i.e., the data or resources the present resource depends on) or child dependencies (i.e., the data or resources that depend on the present resource). Additionally, in some embodiments, the system can determine data dependency. These dependencies can be represented by a directed graph showing relationships and hierarchies between relevant or related data or resources. Also, in some embodiments, dependencies can also encompass relationships based data transformations, or data that has been modified from an original source.

In some embodiments, a resource dependency system can display an interactive resource dependency user interface, such as by including a hierarchical resource repository and a dependency graph user interface. User interactions with a user interface can dynamically update another user interface. For example, a selection of a particular resource in the dependency graph user interface can cause the system to update the dependency graph user interface to indicate the selection and/or to update the hierarchical resource repository to navigate to the appropriate folder corresponding to the stored location of the selected resource. In another example, a selection of a particular resource in the hierarchical resource repository can cause the system to update the hierarchical resource repository to indicate the selection and/or to update the dependency graph user interface to display an updated graph, indicate the selection and, in some embodiments, focus on the selected resource by zooming into a portion of the graph.

In one example, in the context of spreadsheets, for example, one annual report may consolidate data or information from a set of quarterly reports (e.g., some data may be taken from each of the quarterly reports), which may depend on various monthly reports, and so on. In traditional resource-retrieval systems, it would be cumbersome to determine where all the data in the annual report originated from and/or whether the data in the annual report is the most up-to-date or accurate.

In another example, in the context of software development, various users can write software code that present user interfaces and the user interfaces can be based on transformed data (where each of the user interfaces and data sets can be resources). Thus, it would be advantageous to navigate resources based on their dependencies rather than resource location or general searching. In some circumstances a user would not know what to search, where navigating dependencies can lead to the discovery of new information and resource relationships otherwise unknown or unexpected.

In some embodiments, a user can select a particular data set or resource on a graph, and the system can display a number of options in the user interface (e.g., as a pop-up window, or the like) on how to interact with the resource. The options can include, but are not limited to, the ability to view more detailed information about the selected data set, edit metadata associated with the data set, modify listed dependencies, and/or perform additional filtering, for example by textual searching. For instance, if a user enters and applies a textual search, in some embodiments, the graph can update to show the filtered items satisfying the entered search. Another example of searching is allowing a user to search for data sets based on certain criteria, such as user interfaces that use the data set and have over a certain number of users; yet again, the search results can be shown in an updated graph.

In some embodiments, the system can display a graph encompassing two types of dependencies or transformations. A first type of dependency is related to transformations and relationships within the system itself. These relationships can be monitored or tracked as they occur or after the transformations have occurred and the relationships can be stored in the system to be used in rendering a graph. A second type of dependency is related to transformations and relationships external to the system. These relationships and transformations can be received by an external system or determined internally based on metadata and/or a comparison between the resources. In some embodiments, the second type of dependencies can be based at least partly on pre-processing steps performed by a third party prior to transmission of the data to the system. Further, in some embodiments, the graph is displayed in a user interface adjacent to or near a resource folder navigation system user interface. Interactions in one user interface can affect the other. For example, a user selecting an item in the graph can update the folder to where the selected item is stored.

Additionally, some organizations may implement database protocols, data creation and/or maintenance protocols, and/or any relevant best practices for how to organize and configure various resources in a database. Thus, having a resource-retrieval system based on dependencies can further aid in verifying whether a particular resource is adhering to any particular relevant protocol(s). For example, if a resource comprises the correct content and is otherwise stored in a correct resource location, it may still comprise data that depends on another resource that is incorrect or improper. For example, the resource, which may depend on a duplicate resource of the intended resource, as of one date, may appear to be correct. However, once the intended resource is updated, the duplicate resource may not receive the same updates, and the out-of-date information would still be propagated to the original resource without any critical updates.

Thus, in some embodiments, even as data is transformed, modified, and/or combined into new data structures and beyond recognition, the dependency-based navigation structure allows users to constantly maintain and verify the data as it is being used.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.
Resource Dependency System and User Interface FIG. 1 illustrates an example resource dependency user interface 100 of a resource dependency system, including a hierarchical resource repository 102 and a dependency graph user interface 104, according to various embodiments of the present disclosure. The hierarchical resource repository 102 and a dependency graph user interface 104 can be linked together such that interactions in one user interface can affect the other user interface. For example, a selection of a resource or item in the dependency graph user interface 104 can cause the resource dependency system to update one or both of the hierarchical resource repository 102 and dependency graph user interface 104 in real or near-time. The dependency graph user interface 104 can be updated to display an indication of the selection (e.g. bold, shade, highlight, etc.) and the hierarchical resource repository 102 can be updated to display the related hierarchical folder the particular selected resource or item is stored by the system.

The resource dependency system described with reference to FIG. 1, or otherwise herein, can be the same as or similar to the resource dependency system 402 described in FIG. 4 or elsewhere herein.

In one portion of the resource dependency user interface 100, there can be a dependency graph user interface 104, in some embodiments. The dependency graph user interface 104 can include a graphical representation of dependency relationships between a plurality of resources or data sets, for example. The dependency relationships can be based at least partly on how data has transformed or changed. Data transformation can refer to the modification of one or more elements in a data set to convert the data or information from one format to another, such as, but not limited to, by a particular mathematical function. In some embodiments, data transformation can be employed to change data from the format of a source system to the appropriate format of a new destination system. Also, in some embodiments, data transformation can be employed to change data to the appropriate form for a particular test, method, or purpose. In some embodiments, there can be one or more required preprocessing steps to convert collected data into a format required by a destination system. The tracking and use of preprocessing steps are discussed in further detail with respect to FIG. 6. For example, it would be advantageous for a user of a destination system to see the particular preprocessing steps or data transformations employed prior to arriving at the destination system. Additionally, it should be appreciated that in some embodiments, that once resources are in the resource dependency system the transformations and modifications to the resources can be tracked or monitored so that creation of the graph is based on the tracked data. This process is described in further detail with respect to FIG. 5.

The dependency graph user interface 104 displays three data sets as blocks in the center of the graph, which are labeled as "Dataset 1" 109, "Dataset 2" 111, and "Dataset 3" 110. The various data sets are displayed with arrows indicating a relationship (e.g., by directly linking various blocks, and also a direction. The arrows connect various blocks, each block representing a type of resource or data set. For example, the dependency graph user interface 104 can include: (1) raw data sets (e.g., raw data set 112) that represent data sets that have not been modified or changed from the original collecting of the data; (2) transforms (e.g., transform "CD3" 116 and "GCD2" 118) that represent transformations of resources that may have portions of data or information from "Dataset 2" 111, for example, and that have also had an algorithm applied to change the data; and (3) modified data sets (e.g., "Dataset "2 111, "PD1" 114, etc.) that can include a raw data set and/or transform but also can be modified from the original data in a way that is different than a simple algorithm changing the format of the data (e.g., changing the data by adding or removing information from the data set). For example, the "Dataset 2" 111 can be created by a variety of sources. Although the resources listed in the dependency graph user interface 104 can be exhaustive of all sources and dependencies in the resource dependency system, in some embodiments, the resources listed are not exhaustive and there can be additional relationships not depicted (e.g., either not on the screen due to screen size restraints, or not at all due to user settings/preferences/restrictions or system limitations, etc.).

In the example shown in FIG. 1, "Dataset 2" 111 can be based on "PD1" 114 and "GPD5." Such relationships can be described as parent-child relationships, or "PD1" 114 and "GPD5" are parents to the child "Dataset 2" 111. Additionally, "PD1" 114 can be based on "GPD1" 112, "GPD2," "GPD3," and "GPD4." Such relationships can be described as parent-child relationships as well, or "GPD1" 112, "GPD2," "GPD3," and "GPD4" are parents to the child "PD1" 114, and grandparents to the grandchild "Dataset 2" 111. Additionally, "CD2," "CD3" 116, "CD5," "CD6," "CD7," and "GCD2" 118 are based on "Dataset 2" 111, and "GCD2" 118 is also based on "CD6." So, "CD2," "CD3" 116, "CD5," "CD6," and "CD7" can be described as children of the "Dataset 2" 111. Also "GCD2" 118, which is a child of both the "Dataset 2" 111 and "CD6," can be described as a child or grandchild of "Dataset 2" 111. The description can be used to signify which data set is being referred to. For example, "GCD2" may be a data set with multiple columns of data, where one column originated from "CD6" and another column originated from the "Dataset 2" 111. Further the column originating from "CD6" could be a new column that was not necessarily originating from the "Dataset 2" 111, despite having a linking relationship shown in the graph. Thus, it should be appreciated that although relationships are depicted in the graph, further manual or automated analysis can be performed to assess a more detailed granularity of the specific relationships of the resources.

In some embodiments, the dependency graph user interface 104 can also depict various functions and information. For example, the dependency graph user interface 104 can include a legend 120 describing the various colors textures used on the resources so that each resource can be classified as a raw data set, transform, modified data set, or any other classification. Additionally, totals can be displayed next to each category in some embodiments. Also, in some embodiments, the legend 120 can allow modification of its appearance and location in the dependency graph user interface 104, and allow modification of categories depicted on the legend 120. In some embodiments, the legend 120 can be hidden from view or minimized from view. The dependency graph user interface 104 can also include a toolbar 122 that allows the ability to modify or change the layout of the graph. It should be appreciated that the graph of the relationships described can be displayed as it is in FIG. 1, or in another orientation or configuration, for example from top-to-bottom instead of left-to-right, to only display data transforms that occur within the resource dependency system, to display data transforms that occur within the resource dependency system and external to the resource dependency system, etc.

In some embodiments, the resource (or item) dependencies can be automatically determined by the resource dependency system. In some embodiments, the dependencies can be manually entered. In some embodiments, a combination of automatic and manual entry can be used to populate the resource dependencies in the resource dependency system.

The toolbar 122 can also provide tools for modifying one or more data sets by moving the data set representations around, and/or changing the relationships by moving the arrows or drawing in new arrows, for example. The toolbar 122 can allow the expanding or selecting of particular data set representations. The toolbar 122 can also allow for searching through the data sets and the data within each data set with keywords or with more advanced searching features as well.

In another portion of the resource dependency user interface 100, there can be a hierarchical resource repository 102, in some embodiments. The hierarchical resource repository 102 can include a user interface displaying a folder arrangement configured to allow navigation through a series of folders to find and select particular resources. In some embodiments, the hierarchical resource repository 102 can be configured for navigation through selectable folders and selection of a plurality of resources within the selectable folders. For example, a user, through a user device viewing the resource dependency user interface 100, can select a series of nested folders so that they navigate to the folder path 108. The folder path indicates that a user could have selected in storage location Z (e.g., Drive Z, which can be remote or local), a Folder 1, then Folder 2, then Folder 3 to view the contents 107 of Folder 3. The contents 107 include "Dataset 1" 109, "Dataset 3" 110, metadata, and folder 4. In some embodiments, if a user selects the "Dataset 1" 109 or the "Dataset 3" 110, the hierarchical resource repository 102 can update to display the selection and/or open the file associated with the data set. Also, in some embodiments, if a user selects the "Dataset 1" 109 or "Dataset 3" 110, the dependency graph user interface 104 can also be updated in real time to zoom in, focus on, or modify (e.g. highlight or bold) the data set representations associated with the selected data set. In some embodiments, if a user selects the "Folder 4," the hierarchical resource repository 102 would update to show the contents of "Folder 4" and the folder path 108 would update accordingly to show that the user interface is displaying the contents of the "Folder 4," which is nested in "Folder 3" and so forth. In some embodiments, the folder content 107 can be displayed in various formats other than a detailed list. For example, as icons of varying sizes. Also, in some embodiments, the folder content 107 can be listed with details in addition to the date and time last updated and notes. For example, details can also include a list of dependencies and relationships in one or more columns, file size, file type, or any other desired category. If multiple resources are listed in a graph together, their corresponding folder paths can be completely different or exactly the same. For example, in some embodiments, the resources might be stored in the same folder and would therefore have the same folder paths. In other embodiments, the resources might be stored in different folders such that they have completely different folder paths. Yet, in other embodiments, the resources may be in different folders such that that the folder paths may be similar but not exactly the same.

It should also be appreciated that currently viewed folders in the hierarchical resource repository 102 can affect what is displayed in the dependency graph user interface 104, and vice-versa. For example, the "Dataset 1" 109 and the "Dataset 3" 110 appear in both user interfaces and correspond to the same respective data sets. Data sets or resources depending on or depending from the "Dataset 1" 109 and/or the "Dataset 3" 110 may also be displayed in whole or in part in the dependency graph user interface 104, as described in more detail above. In some embodiments, related data sets (e.g., the "Dataset 2" 111) can also be displayed, where relatedness can be determined based at least partly on preconfigured criteria. Preconfigured criteria can based on a preset threshold or limit based on the number of similar dependency relationships (i.e., parents, children, etc.) and/or a comparison of the data within the data sets resulting in a similarity score. In some embodiments, the "Dataset 1" 109, "Dataset 2" 111, and "Dataset 3" 110 can be referred to as brothers or sisters with respect to their dependency on each other and/or other resources. In some embodiments, the brother or sister classification can also be preprogrammed so that they resources appear together in the dependency graph user interface 104.

In some embodiments, the resource dependency user interface 100 can include a panel 103 comprising additional navigation tools. This panel 103 can appear as a part of the hierarchical resource repository 102, or as a separate user interface element. In some embodiments, the panel 103 can include options 106 that enable functions such as search, sorting, filtering, and sharing options. Also, the panel 103 can also allow for saving or pinning various projects 110 and user interface configurations to be used later or shared with a group or particular user.

Figure 2:
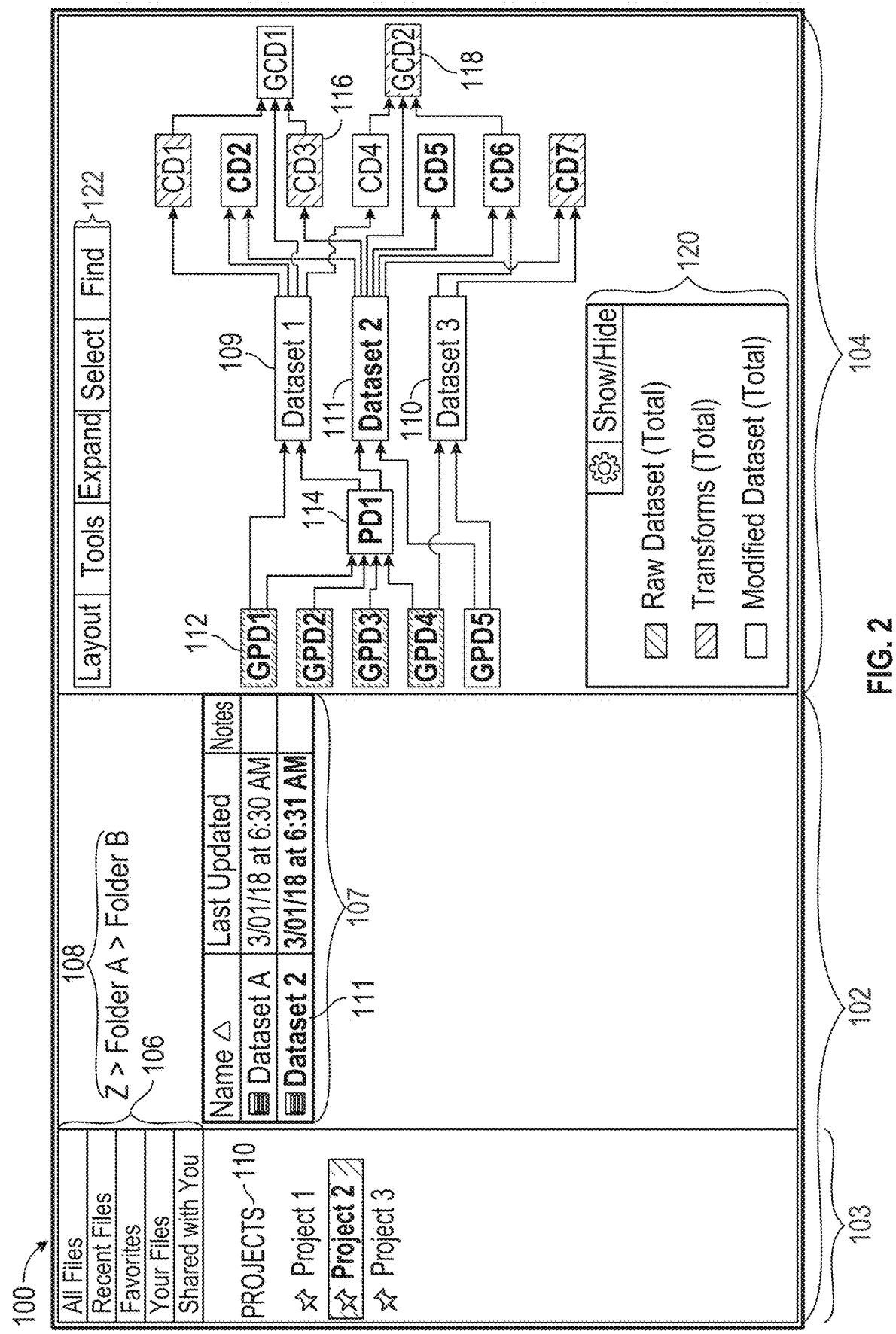
FIG. 2 illustrates the example resource dependency user interface of a resource dependency system from FIG. 1, showing a selection of a resource via the dependency graph user interface, according to various embodiments of the present disclosure.

FIG. 2 illustrates the same example resource dependency user interface 100 from FIG. 1, showing a selection of a resource via the dependency graph user interface 104, according to various embodiments of the present disclosure. In this example, a user has selected "Dataset 2" 111 in the dependency graph user interface 104. In some embodiments, the representation of the "Dataset 2" 111, its children, and parent resources can be modified to indicate the selection. In the present example illustrated in FIG. 2, the selected resource and related resources are all made bold. Other colors, shapes, zoom level, and resource orientations (e.g., the selected set can be moved or separated from the other resources) can be used to signify the selection. For example, while not illustrated, once a resource in the graph is selected, the graph can update to shown children and/or parent resources of the selected resource and remove any other less related, or unrelated, resource from the graph. In some embodiments, not all resource dependencies in the system may be displayed on the graph. For example, when an item is selected, the system may want to re-determine the dependency relationships of the selected item and update the graph based on the re-determination. If another item is selected in the graph, the graph can then update with new dependencies, if any exist, along with any zooming, panning, highlighting, or the like, to change the focus of the graph.

In some embodiments, as a selection is made in the dependency graph user interface 104, the hierarchical resource repository 102 can update to display the folder, folder path 108, and folder contents 107 corresponding to the selected resource. In the present example, the folder path 108 is displayed as Folder B, which is in Folder A of resource location Z. Also, the folder contents 108 include the selected resource, the "Dataset 2" 111, and the "Dataset A." As described above and herein, a user can interact with any portion of the user interface, and such interactions can affect one or more other portions of the user interface to update.

Figure 3:
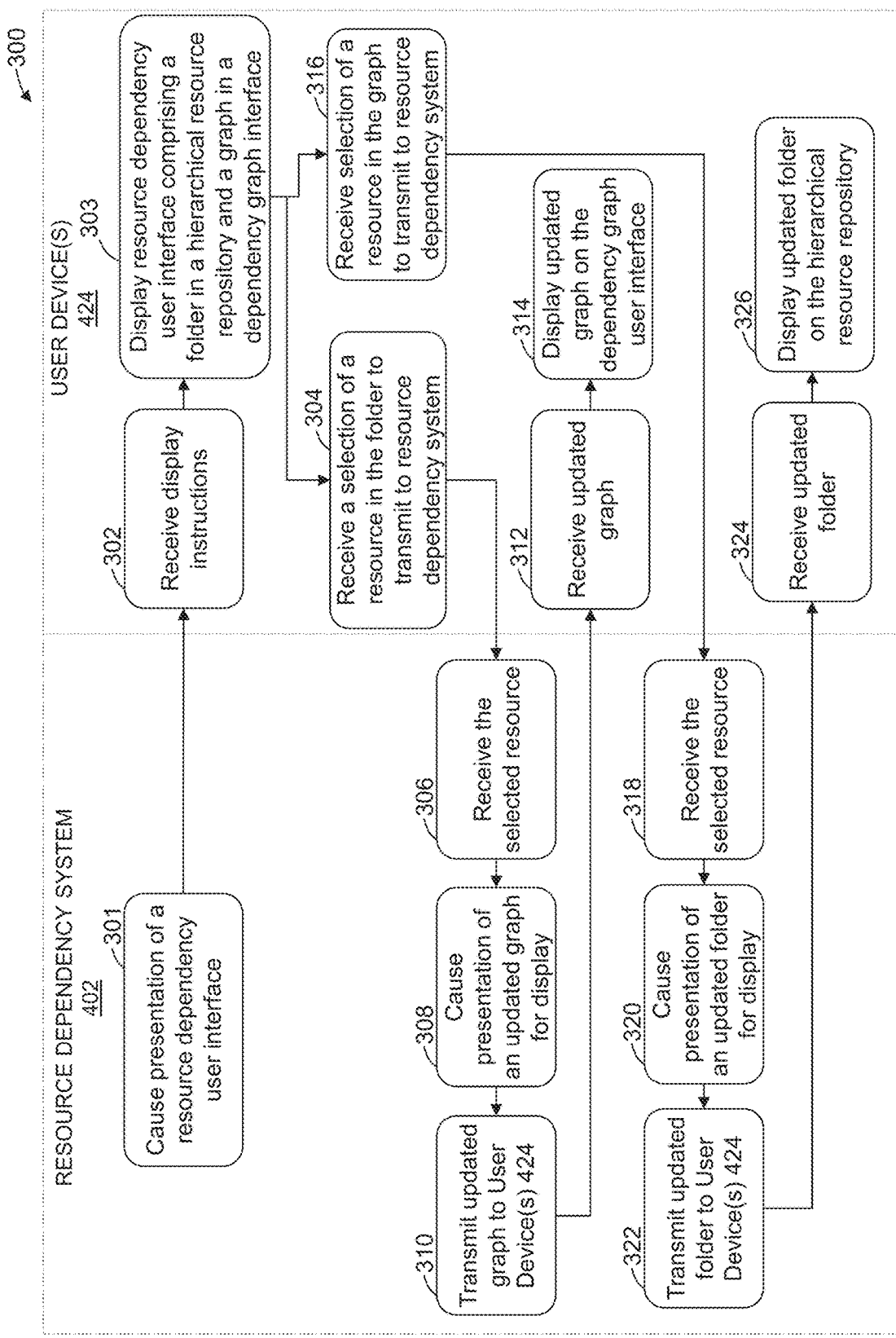
FIG. 3 illustrates a flow chart diagram illustrating functionality of the resource dependency system related to dynamically updating the hierarchical resource repository and dependency graph user interface, according to various embodiments of the present disclosure.

FIG. 3 illustrates a flow chart diagram 300 illustrating functionality of the resource dependency system 402 related to dynamically updating the hierarchical resource repository and dependency graph user interface, according to various embodiments of the present disclosure. The steps and/or blocks of FIG. 3 should be interpreted to be acceptable in no particular order, except where the system or method would not function for its intended purpose. One or more of the blocks described may be optional in certain implementations. Additionally, the discussion below and herein describes features associated with a resource dependency system 402 and features associated with one or more user device(s) 424, as well as any other system used to assist in implementing or enhancing the features described herein. In some embodiments, the resource dependency system 402 can encompass some or all of the features of the user device(s) 424. The hierarchical resource repository and dependency graph user interface can be the same hierarchical resource repository 102 and dependency graph user interface 104 as described above with reference to FIGS. 1 and 2. In some embodiments of the flow chart diagram 300, while certain blocks are shown as being performed by the user device(s) 424, in other embodiments, those block(s) can be performed by the resource dependency system 402, such as receiving certain user input or causing presentation of an updated graph.

At block 301, the resource dependency system 402 can cause presentation of a resource dependency user interface (e.g., the resource dependency user interface 100 of FIGS. 1 and 2). In some embodiments, the resource dependency user interface comprises a folder in a hierarchical resource repository and a graph in a dependency graph user interface, as described herein. In some embodiments one or both of the folder and graph are configured to receive one or more selections of one or more resources.

At block 302, the user device(s) 424 can receive the display instructions from the resource dependency system 402 regarding how to display the resource dependency user interface. At block 303, the user device(s) 424 displays the resource dependency user interface such that the resource dependency user interface includes at least a folder in a hierarchical resource repository and at least a graph in a dependency graph user interface. In some embodiments, the two user interfaces are linked so that selections or modifications in one user interface affect the other, and vice-versa.

In one instance, at block 304, the user device(s) 424 receive(s) a selection of a resource from the folder in the hierarchical resource repository. Then the user device(s) 424 transmit(s) the selection to the resource dependency system 402.

At block 306, the resource dependency system 402 receives the selected resource or the indication of what resource is selected and processes the information. In some embodiments, processing the information can include looking up the resource in a data structure, such as a graph, searching additional databases for data or metadata pertaining to the selection, or any other method desirable user or that would otherwise improve the efficiency of the system. For example, in some embodiments, processing can include traversal of every resource node in the graph to analyze and determine the web of dependencies associated with each resource node. Additionally or alternatively, each resource can be stored in an index, such as a hash data structure, which contains information about what graph(s) the resource is in.

Then at block 308, the resource dependency system 402 causes presentation of an updated graph for display on the dependency graph user interface based at least partly on the selected resource. For example, the user interface depicted in FIG. 2 depicts the same user interface as FIG. 1 except with resource node "Dataset 2" 111 selected from the dependency graph user interface 104. In some embodiments, the representation of the "Dataset 2" 111, its children, and parent resources can be modified to indicate the selection. In the example illustrated in FIG. 2, the selected resource and related resources are all made bold. Other colors, shapes, zoom level, and resource orientations (e.g., the selected set can be moved or separated from the other resources) can be used to signify the selection. In another example, once a resource in the graph is selected, the graph can update to shown children and/or parent resources of the selected resource and remove any other less related, or unrelated, resource from the graph.

At block 310, the resource dependency system 402 transmits the updated graph to the user device(s) 424.

At block 312, the user device(s) 424 receive(s) the updated graph and processes the information. Then at block 314, the user device(s) 424 display(s) the updated graph on the dependency graph user interface.

In another instance, at block 316, the user device(s) 424 receive(s) a selection of a resource from the graph in the dependency graph interface user interface. Then the user device(s) 424 transmit(s) the selection to the resource dependency system 402.

At block 318, the resource dependency system 402 receives the selected resource or the indication of what resource is selected and processes the information. In some embodiments, processing the information can include looking up the resource in a data structure, such as a graph, searching additional databases for data or metadata pertaining to the selection, or any other method desirable user or that would otherwise improve the efficiency of the system. In some embodiments, processing can include instructions for what the system should do upon selection of a node in the graph. For example, each resource or resource node may have additional data or metadata associated with it, such as an identifier or folder path (e.g., Z/Folder X/Folder A).

Then at block 320, the resource dependency system 402 causes presentation of an updated folder for display on the hierarchical resource repository based at least partly on the selected resource. At block 322, the resource dependency system 402 transmits the updated folder to the user device(s) 424.

At block 324, the user device(s) 424 receive(s) the updated folder and processes the information. Then at block 326, the user device(s) 424 display(s) the updated folder on the hierarchical resource repository. For example, the user interface depicted in FIG. 2 depicts the same user interface as FIG. 1 except with resource node "Dataset 2" 111 selected from the dependency graph user interface 104. In some embodiments, the selection of "Dataset 2" 111 from the graph can update the folder in real time to display information related to the selection, "Dataset 2" 111, or both. In the example illustrated in FIG. 2, the folder and folder path are changed to display the folder and folder path associated with the resource node "Dataset 2" 111 displayed in the graph. For example, in some embodiments, each resource or resource node may have additional data or metadata associated with it, such as an identifier or folder path (e.g., Z/Folder X/Folder A). So, when the resource node is selected, the system can update the folder and folder path based on the associated data/metadata.

Blocks 304-314 and block 316-326 can be programed to occur within the same embodiments. However, in some embodiments, one block path (i.e., blocks 304-314 or block 316-326) may be prevented based on particular system configurations, data or system limitations, user group settings, etc.

Figure 4:
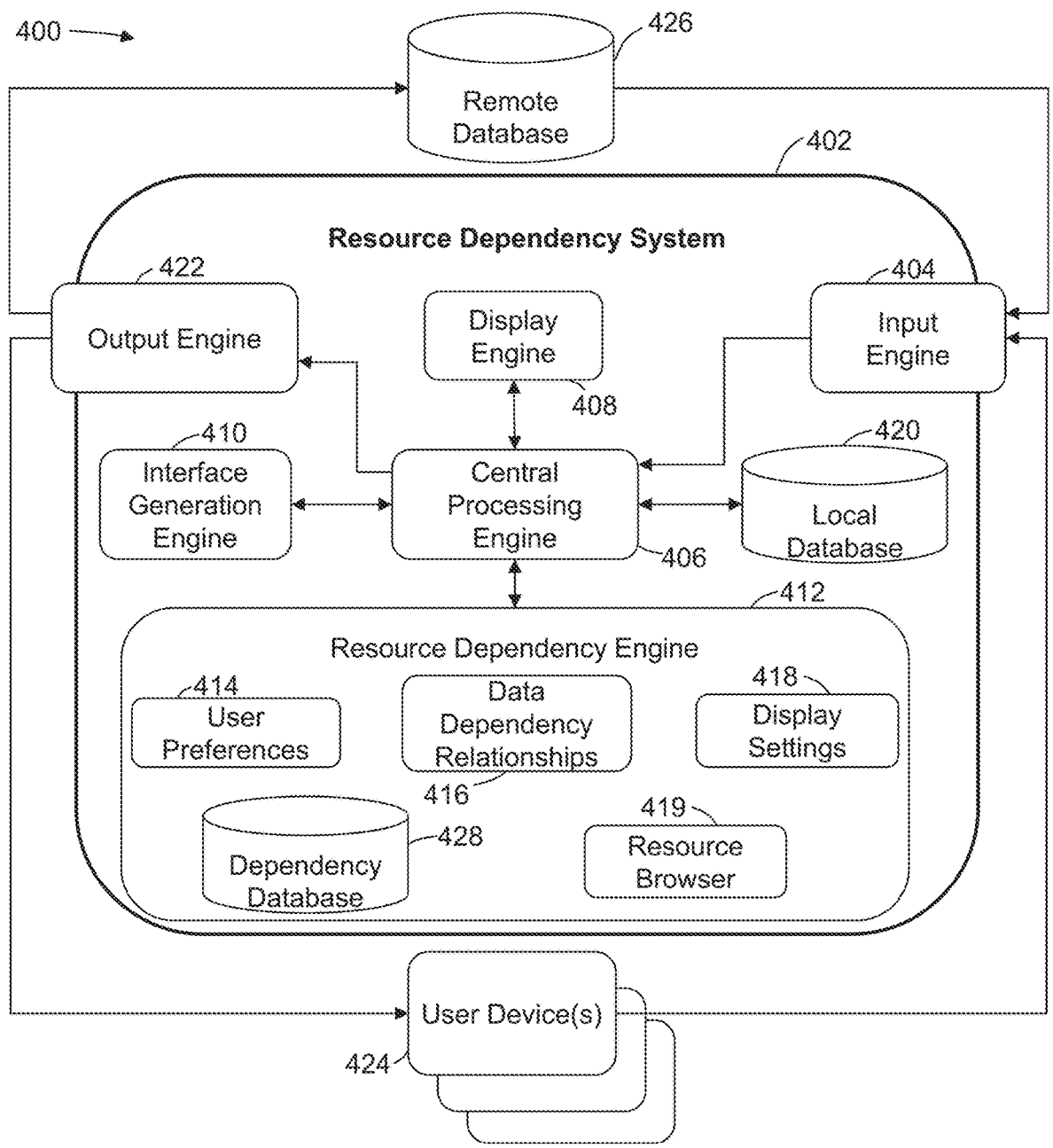
FIG. 4 illustrates an embodiment of a block diagram of the resource dependency system, also illustrating how the components are in communication with each other.

FIG. 4 illustrates an embodiment 400 of a block diagram of a resource dependency system 402, also illustrating how the components are in communication with each other. The resource dependency system 402 may be the same as the resource dependency system described in FIG. 3 and herein. Also, the resource dependency system 402 includes many components. The components described herein are not meant to be exhaustive but only a sample of what components may be implemented in a resource dependency system 402. Some components may be combined and others may be removed or substituted with similar components.

The resource dependency system 402, as described in FIG. 4, includes an input engine 404, a dependency engine 412, a central processing engine 406, an interface generation engine 410, a display engine 408, an output engine 422, and a local database 420. the user device(s) 424 are the same user devices as described herein, each user device having access to view an interactive user interface of the resource dependency system 402. The remote database 626 and the user device(s) 424 may communicate with the resource dependency system 402 over a local area network, the internet, or any other suitable means. In some embodiments, the remote database 426, local database 420, and/or dependency database 428 can store data sets, files, or dependency relationship metadata for data sets or files. The remote database 426 may also be a local network database or a local database 420 in some implementations, or as a part of the resource dependency engine 412 (for example, the dependency database 428).

It should be appreciated that in some embodiments, the dependency database 428 may only comprise dependency related metadata. In some embodiments, the resources can be stored in a blockchain or distributed ledger, using distributed ledger technology. For example, data can be converted using the InterPlanetary File System (IPFS) protocol to create a content-addressable, peer-to-peer method of storing data in a distributed file system. The IPFS protocol would break a particular file into multiple pieces, sign it cryptographically, and store it on difference computer nodes around the world. The protocol would return a hash which can uniquely identify the file. The hash can then be stored on a blockchain or distributed ledger. To retrieve the file, the blockchain or distributed ledger network can be queried to pull out the hash. With the hash, a query can be sent to IPFS network with the retrieved hash. Then the IPFS network will return the original file. This ensures that the uploaded file is secure, stored permanently, and cannot be tampered with.

The input engine 404 interfaces with one or more user device(s) 424 through a local area network or the internet. User device(s) 424 may provide instruction or information to the resource dependency system 402. The input engine 404 receives then sends any instructions or information to the central processing engine 406.

The central processing engine 406 receives data and information from the input engine 404 and processes the data depending on the methods described in FIG. 3 and herein, for example. In one embodiment, the central processing engine 406 sends data to a resource dependency engine 412, an interface generation engine 410, and a display engine 408. The central processing engine 406 also communicates with the display engine 408, the interface generation engine 410, and the output engine 422.

The resource dependency engine 412 includes user preferences 414, data dependency relationships 416, display settings 418, a resource browser 419, and a dependency database 428. In some embodiments, certain aspects of the resource dependency engine 412 can be performed by a back-end server and other aspects can be performed by a user's computing device. In some embodiments, the resource dependency system 402 can be just the user device 424 or a back-end server. The user preferences 414 can comprise various customizations or preferences a user device 424 preconfigured on how the user associated with the user device 424 prefers to view the various data. In some embodiments, the user preferences 414 can be based on the associated user's title or role in a company. The data dependency relationships 416 and/or display settings 418 can comprise various customizations or preferences on how the members of a particular group prefer to view the data. For example, user device(s) 424 within a certain department in an organization may be presented with data that is different from what user device(s) 424 in another department are presented with. The display settings 418 can be based partly on the user preferences 414 or data dependency relationships 416, but also include any particular preferences for each individual data set or resource, as opposed to instructions or settings pertaining to resources or data generally. For example, the display settings 418 can include for a particular data set, formatting instructions based on the user, group, administrator, or the like for a data set to appear in a certain way on the resource graph user interface, present a certain set of data, and/or be located in a certain location on the resource graph user interface. Additionally, the resource dependency engine 412 may include a resource browser 419 for user device(s) 424 to interact with the resource dependency user interface (for example, the user interface 100 in FIG. 1). A dependency database 428 may also be a component of the resource dependency engine 412 and be used to store data sets, files, or dependency relationship metadata for data sets or files. In some embodiments, the resource browser 419 may also include the dependency database 428, or a local database 420. Finally, each determination made by the resource dependency engine 412 is transmitted to the central processing engine 406 for eventual rendering and generating a resource dependency user interface.

The interface generation engine 410 creates a user interface based on instructions received from the user device(s) 424. Such instructions may include instructions on what dependency graph user interface and/or hierarchical resource repository to create, and/or what data the resource dependency system 402 should obtain from the remote database 426. It should be appreciated that the remote database 426 may comprise a plurality of databases. Also, for example, the interface generation engine 410 can send a request for resources to the remote database 426, which can then send information to the input engine 604, to be processed by the central processing engine 406, and to then be used in the creation of various resource nodes by the resource dependency engine 412, which will then be used to create a resource dependency user interface by the interface generation engine 410. Upon completion of creating or updating resource dependency user interface, the rendered resource dependency user interface is transmitted to the central processing engine 406 to determine any further updating, filtering, formatting, or processing of resources or data.

The display engine 408 receives the final instructions from the central processing engine 406 on how to display the resource dependency user interface (for example, the resource dependency user interface user interface 100 in FIG. 1) for each user device 424. The display engine 408 outputs customized information to the user device(s) 424 for viewing and interacting with.

In an implementation the resource dependency system 402 (or one or more aspects of the resource dependency system 402) can include, or be implemented in, a "virtual computing environment." As used herein, the term "virtual computing environment" should be construed broadly to include, for example, computer readable program instructions executed by one or more processors (e.g., as described below in the example of FIG. 8) to implement one or more aspects of the modules and/or functionality described herein. Further, in this implementation, one or more modules or engines (e.g., input engine 404, output engine 422, interface generation engine 410, display engine 408, central processing engine 406, and/or resource dependency engine 412) of the resource dependency system 402 may be understood as comprising one or more rules engines of the virtual computing environment that, in response to inputs received by the virtual computing environment, execute rules and/or other program instructions to modify operation of the virtual computing environment. For example, a request received from the user device(s) 424 may be understood as modifying operation of the virtual computing environment to cause the resource dependency engine 412 to generate user interfaces, the interface generation engine 410 to generate a user interface, the display engine 408 to display the user interface, and the output engine 422 to transmit the rendered user interface back to the user device(s) 424. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by input engine 404 from the remote database 426. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the resource dependency system 402 as a virtual computing environment may advantageously enable executing different aspects or modules of the system on different computing devices or processors, which may increase the scalability of the system. Implementing one or more aspects of the resource dependency system 402 as a virtual computing environment may further advantageously enable sandboxing various aspects, data, or modules of the system from one another, which may increase security of the system by preventing, e.g., malicious intrusion into the system from spreading. Implementing one or more aspects of the resource dependency system 402 as a virtual computing environment may further advantageously enable parallel execution of various aspects or modules of the system, which may increase the scalability of the system. Implementing one or more aspects of the resource dependency system 402 as a virtual computing environment may further advantageously enable rapid provisioning (or de-provisioning) of computing resources to the system, which may increase scalability of the system by, e.g., expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

Figure 5:
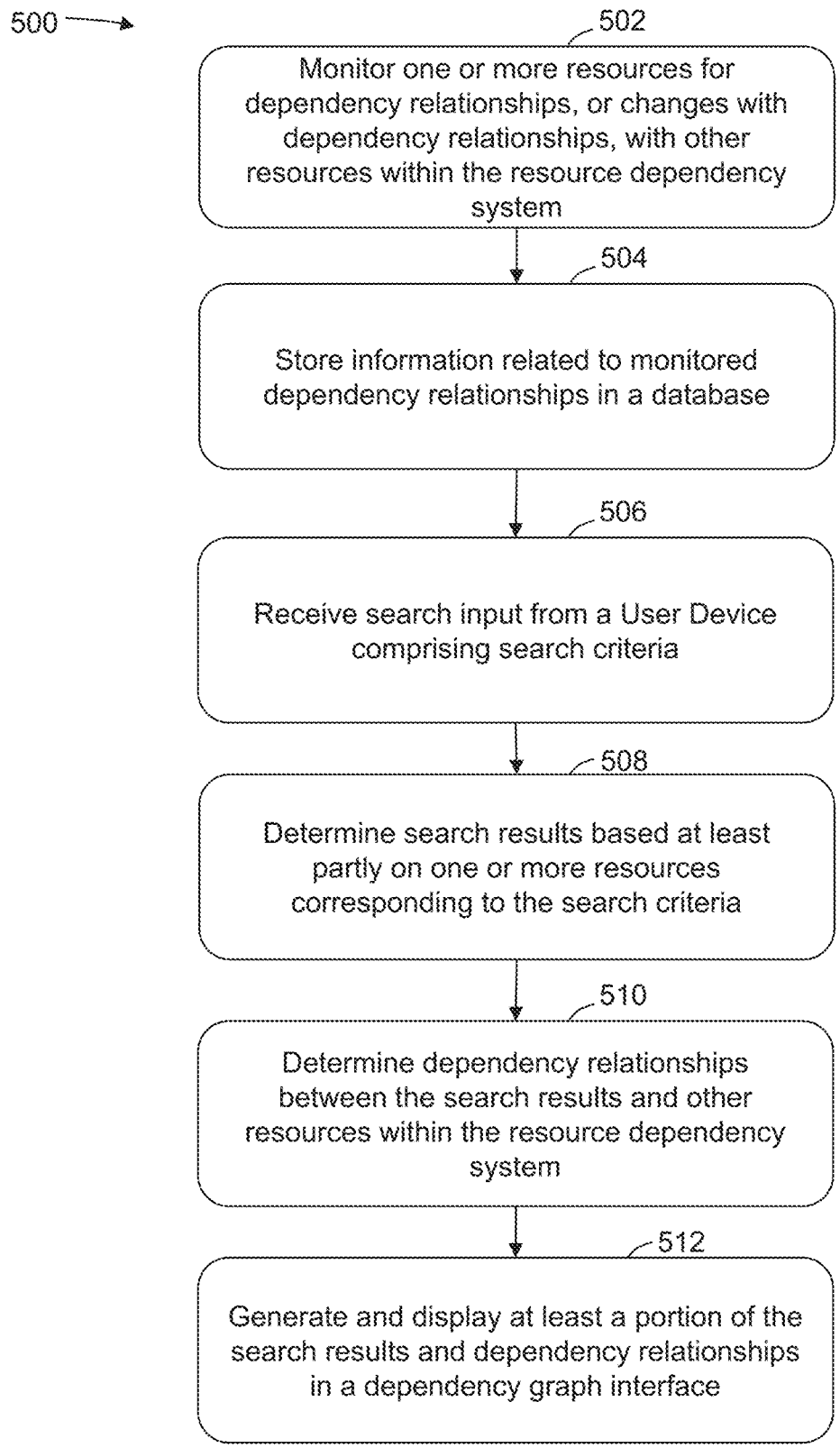
FIG. 5 illustrates a flow chart diagram illustrating functionality of the resource dependency system related to monitoring, storing, and displaying various resource dependency relationships created within the resource dependency system, according to various embodiments of the present disclosure.

FIG. 5 illustrates a flow chart diagram 500 illustrating functionality of the resource dependency system related to monitoring, storing, and displaying various resource dependency relationships created within the resource dependency system, according to various embodiments of the present disclosure. Steps and/or blocks of FIG. 5should be interpreted to be acceptable in no particular order, except where the system or method would not function for its intended purpose. One or more of the blocks described may be optional in certain implementations. Additionally, the discussion below and herein describes features associated with a resource dependency system 402 and features associated with one or more user device(s) 424, as well as any other system used to assist in implementing or enhancing the features described herein. In some embodiments, the resource dependency system 402 can encompass some or all of the features of the user device(s) 424. The hierarchical resource repository and dependency graph user interface can be the same hierarchical resource repository 102 and dependency graph interface user interface 104 as described above in reference to FIGS. 1 and 2.

At block 502, the resource dependency system can monitor or track one or more resources for dependency relationships, or changes with the dependency relationships, with other resources within the resource dependency system. For example, as soon as a new resource is imported, downloaded, created, or otherwise enters the system, the resource dependency system can constantly monitor for any changes to the data within the resource, the metadata associated with the resource, or any other relevant data or information that can be used to monitor the dependency relationships. In some embodiments, instead of monitoring, one or more events can cause the resource dependency system to update the dependencies for a resource.

In some embodiments, constant tracking, or tracking generally, may not even be necessary. For example, dependency relationships can be wholly or partly determined through one or more analytical methods. The system can analyze the data associated with the resources, and based on a comparison between the resources, the resource dependency system can determine a score indicative of the likelihood of a dependency relationship between the two data sets. If the score is within a threshold, the relationship can be stored or displayed to the user through a resource dependency interface user interface. Further, it should be appreciated that a combination of monitoring and analytical methods can be employed to comprehensively determine and/or verify dependency relationships within the resource dependency system.

At block 504, the resource dependency system can store information related to the monitored dependency relationships in a database. In some embodiments, the resource dependency system can also store information related to the dependency relationships determined through one or more analytical methods as described, or a combination of monitored or determined dependency relationships. It should be appreciated that the relationships information can be stored in any of the databased described herein, for example, remote database 426, local database 420, dependency database 428, and/or any other database otherwise internal or external to the system.

At block 506, the resource dependency system can receive a search input from a user device (e.g. user device 424 described herein) comprising search criteria. The search criteria can include a string of characters to search, a particular resource to search by to view all dependency relationships, and/or more advanced search features (e.g., by user, date, etc.). For example, a search of all user interfaces that have more than a certain number of users using a particular resource can be received from a user device.

At block 508, the resource dependency system can determine the search results based at least partly on one or more resources corresponding to the search criteria from block 506. Then in block 510, the resource dependency system can determine dependency relationships between the determined search results from block 508 and other resources within the resource dependency system. With respect to the example above, where a search of all user interfaces having more than a certain number of users (e.g., 100 users) using a particular resource is received from a user device, the resource dependency system can make the determination at block 508 and output the results at block 510. The output can appear as updates to the folder and/or graph. In some embodiments, a separate list can be displayed to show the results in a separate window or section of the user interface. Additionally, in some embodiments, the resource dependency system can automatically suggest results based on searches and interactions with other users with the resource dependency system, so that an item that is being accessed by many users can be displayed based on the frequency of use, for example.

At block 512, the resource dependency system can generate and display at least a portion of the search results determined from block 508 and at least a portion of the dependency relationships determined from block 510 in a dependency graph interface user interface and/or in a resource dependency interface user interface.

Figure 6:
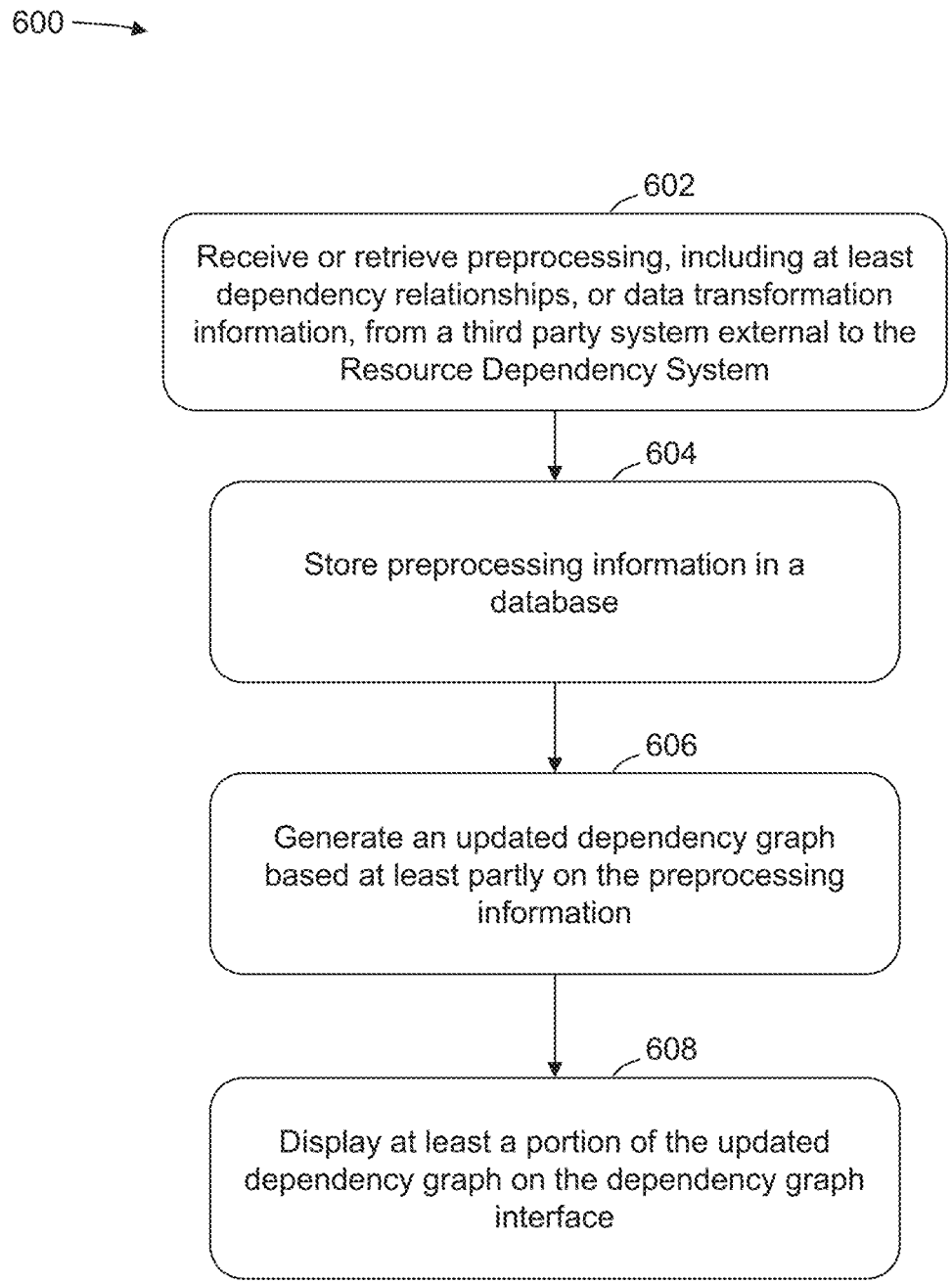
FIG. 6 illustrates a flow chart diagram illustrating functionality of the resource dependency system related to receiving or retrieving various resource dependency relationships created from a third party system external to the resource dependency system, according to various embodiments of the present disclosure.

FIG. 6 illustrates a flow chart diagram 600 illustrating functionality of the resource dependency system related to receiving or retrieving various resource dependency relationships created from a third party system external to the resource dependency system, according to various embodiments of the present disclosure. Steps and/or blocks of FIG. 6 should be interpreted to be acceptable in no particular order, except where the system or method would not function for its intended purpose. One or more of the blocks described may be optional in certain implementations. Additionally, the discussion below and herein describes features associated with a resource dependency system 402 and features associated with one or more user device(s) 424, as well as any other system used to assist in implementing or enhancing the features described herein. In some embodiments, the resource dependency system 402 can encompass some or all of the features of the user device(s) 424. The hierarchical resource repository and dependency graph interface user interface can be the same hierarchical resource repository 102 and dependency graph interface user interface 104 as described above in reference to FIGS. 1 and 2.

At block 602, the resource dependency system can receive or retrieve preprocessing information (e.g., information regarding where the data entering the resource dependency system originates from, what information is available to the resource dependency system, information regarding what information was selected from the available data, recorded database queries, etc.) performed by a third party system external to a destination system (e.g., a resource dependency system). The preprocessing information received can include a plurality of resources, dependency relationships between a plurality of resources, data transformation information related to the resources, steps taken by the third party system to transform the data and/or any other information that be used for relating resources or displaying said resources in a user interface. For example, it would be advantageous for a user of a destination system to see the particular preprocessing steps, or data transformations, employed prior to arriving at the destination system. The preprocessing information can be displayed on a graph alongside monitored dependency relationships, and changes to the dependency relationships, preformed within the resource dependency system, as described in FIG. 5 and herein.

In some embodiments, the resource dependency system can use a data importer to retrieve preprocessing information. In previous systems, the data importer retrieves data that gets used in a data transformation graph, such as importing a single table out of a thousand tables in an external database. However, the resource dependency system can include an improved data importer that retrieves additional preprocessing information, such as the additional thousand tables that previously were not represented in the resource dependency system. Accordingly, the data importer can retrieve metadata regarding data that could be possibly imported into the data pipeline system. In situations where the third-party system includes an external database, such as an external relational database, procedures, queries, such as SQL queries, or database views can be extracted from the external database by the data importer. For example, if a data set (such as a table) is being imported into the data pipeline system, the data importer can discover that one or more queries or procedures that are associated with the data set (such as the queries or procedures that retrieve or modify the data set). Example preprocessing information can include additional data sets, code, procedures, and queries that are related to imported data in a data pipeline system, where a relation between two data sets can include those data sets originating from the same data source or database. This preprocessing information can be used by the resource dependency system and ultimately shown to a user, which enables a user to have a better understanding of the provenance of data as well other data sets that could be brought into the data pipeline system.

For example, the data importer can query an external database to retrieve metadata. Example metadata includes additional data sets, such as tables, code, procedures, and/or queries. The resource dependency system can generate preprocessing information from the metadata. For example, additional data sets that are not currently represented in the data pipeline system can be determined from the metadata and represented in the preprocessing information. As another example, one or more queries or procedures from the external database can be parsed by the resource dependency system and included in the preprocessing information, which can be used by the resource dependency system to represent each of those queries or procedures as nodes in a graph.

At block 604, the resource dependency system can store the preprocessing information in a database. In some embodiments, preprocessing information can be wholly or partly determined through analytical methods. The system can analyze the preprocessing information and based on a comparison between the preprocessing information and other data in or external to the system, the system can determine a score indicative of the likelihood of a dependency relationship between various resources within the preprocessing information. For example, in some embodiments, the resource dependency system may determine the preprocessing information by analyzing the information retrieved or received from the third party system that only comprises a portion of the preprocessing information and deducing the full set of preprocessing information from the portion of the preprocessing information. It should be appreciated that the relationships information can be stored in any of the databased described herein, for example, remote database 426, local database 420, dependency database 428, and/or any other database otherwise internal or external to the system.

At block 606, the resource dependency system can generate an updated dependency graph based at least partly on the preprocessing information. In some embodiments, the resource dependency system may also display virtual or placeholder nodes in the graph. For example, the resource dependency system may receive a table or data set that has already been preconfigured by an external system. The resource dependency system can then detect or predict the steps involved in preparing the table or data set and assigned one or more virtual or placeholder nodes in the graph to represent those steps. For example, the resource dependency system can parse various SQL queries to map the steps the external system may have taken to create the one or more virtual or placeholder nodes. For example, a user could zoom in on a placeholder node representing one or more steps associated with a data set that is imported into the data pipeline system; upon zooming in on the placeholder node, additional nodes can be shown that represent additional data sets in the external database, or additional queries, code, or procedures related to the data set that was imported into the data pipeline system.

Then, at block 608, the resource dependency system can display at least a portion of the dependency graph on the dependency graph interface user interface.

Example Data Pipeline Context

Figure 7:
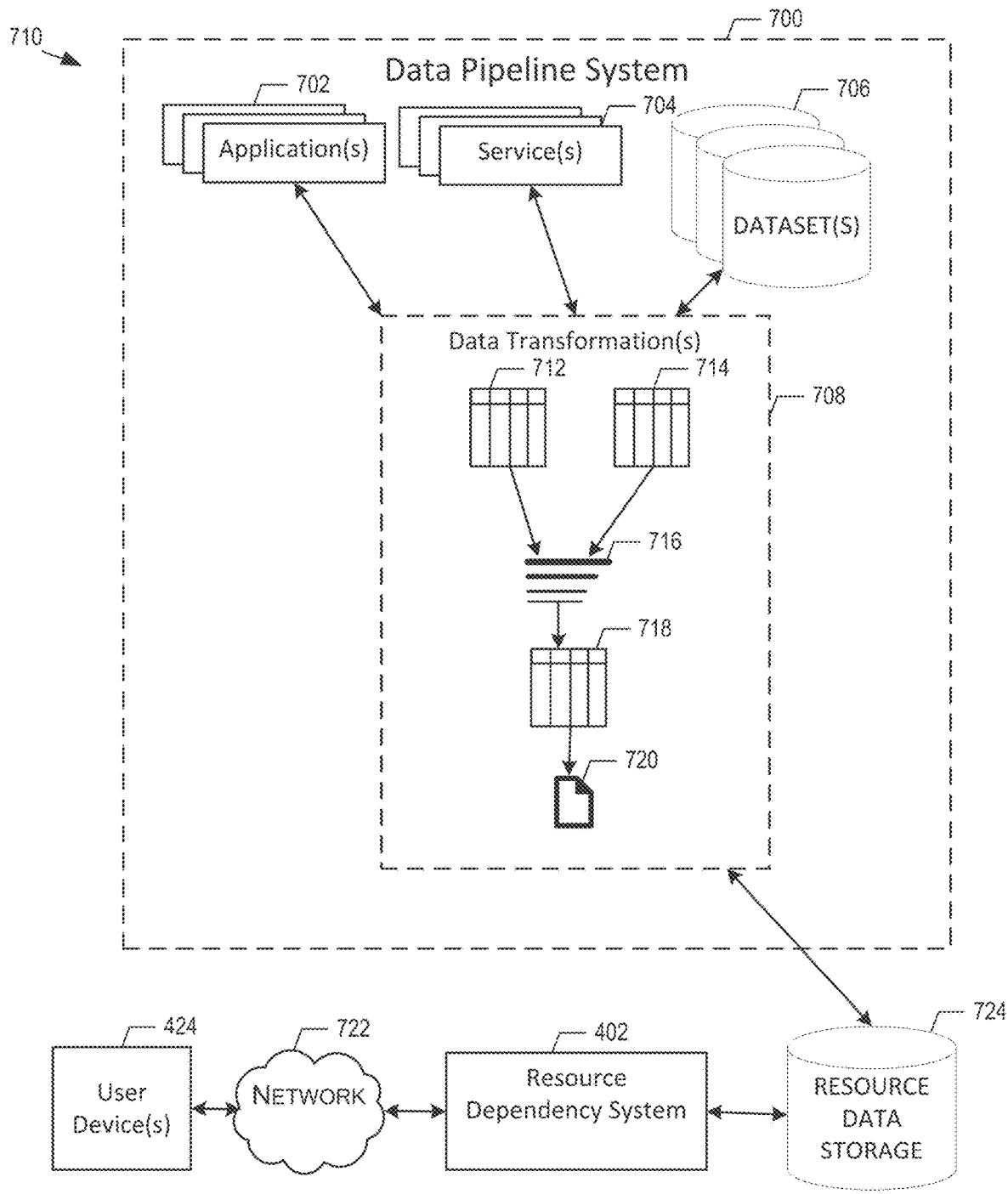
FIG. 7 is a block diagram illustrating an example resource dependency system in a data pipeline context, according to various embodiments of the present disclosure.

FIG. 7 illustrates a resource dependency system 402 in a data pipeline context, according to some embodiments of the present disclosure. In the embodiment of FIG. 7, the computing environment 710 can be similar to the computing environments described herein with respect to the other Figures. For example, the computing environment 710 can include a network 722, a resource dependency system 402, user device(s) 424, and a resource data storage 724, each of which may be similar to respective devices and systems in computing environments described herein with respect to the other Figures. For example, the resource data storage 724 can be included in the resource dependency system 402, or the resource data storage 724 can be one or more of the remote database 426, local database 420, and/or dependency database 428. However, the computing environment 710 can also include a data pipeline system 700.

The example data pipeline system 700 includes one or more applications 702, one or more services 704, one or more initial data sets 706, and a data transformation process 708 (also referred to herein as a build process). The data pipeline system 700 can transform data and record the data transformations. The one or more applications 702 can include applications that enable users to view data sets, interact with data sets, filter data sets, and/or configure data set transformation processes or builds. The one or more services 704 can include services that can trigger the data transformation builds and API services for receiving and transmitting data. The one or more initial data sets 706 can be automatically retrieved from external sources and/or can be manually imported by a user. The one or more initial data sets 706 can be in many different formats such as a tabular data format (SQL, delimited, or a spreadsheet data format), a data log format (such as network logs), or time series data (such as sensor data).

The data pipeline system 700, via the one or more services 704, can apply the data transformation process 708. An example data transformation process 708 is shown. The data pipeline system 700 can receive one or more initial data sets 712, 714. The data pipeline system 700 can apply a transformation to the data set(s). For example, the data pipeline system 700 can apply a first transformation 716 to the initial data sets 712, 714, which can include joining the initial data sets 712, 714 (such as or similar to a SQL JOIN), and/or a filtering of the initial data sets 712, 714. The output of the first transformation 716 can include a modified data set 718. A second transformation 720 of the modified data set 718 can result in an output data set 720, such as a report. Each of the steps in the example data transformation process 708 can be recorded by the data pipeline system 700 and made available as a resource to the GUI system 100. For example, a resource can include a data set and/or a data set item, a transformation, or any other step in a data transformation process. As mentioned above, the data transformation process or build 708 can be triggered by the data pipeline system 700, where example triggers can include nightly build processes, detected events, or manual triggers by a user. Additional aspects of data transformations and the data pipeline system 700 are described in further detail below.

The techniques for recording and transforming data in the data pipeline system 700 may include maintaining an immutable history of data recording and transformation actions such as uploading a new data set version to the system 700 and transforming one data set version to another data set version. The immutable history is referred to herein as "the catalog." The catalog may be stored in a database. Preferably, reads and writes from and to the catalog are performed in the context of ACID-compliant transactions supported by a database management system. For example, the catalog may be stored in a relational database managed by a relational database management system that supports atomic, consistent, isolated, and durable (ACID) transactions.

The catalog can include versioned immutable "data sets." More specifically, a data set may encompass an ordered set of conceptual data set items. The data set items may be ordered according to their version identifiers recorded in the catalog. Thus, a data set item may correspond to a particular version of the data set. A data set item may represent a snapshot of the data set at a particular version of the data set. As a simple example, a version identifier of '1' may be recorded in the catalog for an initial data set item of a data set. If data is later added to the data set, a version identifier of '2' may be recorded in the catalog for a second data set item that conceptually includes the data of the initial data set item and the added data. In this example, data set item '2' may represent the current data set version and is ordered after data set item '1'.

As well as being versioned, a data set may be immutable. That is, when a new version of the data set corresponding to a new data set item is created for the data set in the system, pre-existing data set items of the data set are not overwritten by the new data set item. In this way, pre-existing data set items (i.e., pre-existing versions of the data set) are preserved when a new data set item is added to the data set (i.e., when a new version of the data set is created). Note that supporting immutable data sets is not inconsistent with pruning or deleting data set items corresponding to old data set versions. For example, old data set items may be deleted from the system to conserve data storage space.

A version of data set may correspond to a successfully committed transaction against the data set. In these embodiments, a sequence of successfully committed transactions against the data set corresponds to a sequence of data set versions of the data set (i.e., a sequence of data set items of the data set).

A transaction against a data set may add data to the data set, edit existing data in the data set, remove existing data from the data set, or a combination of adding, editing, or removing data. A transaction against a data set may create a new version of the data set (i.e., a new data set item of the data set) without deleting, removing, or modifying pre-existing data set items (i.e., without deleting, removing, or modifying pre-existing data set versions). A successfully committed transaction may correspond to a set of one or more files that contain the data of the data set item created by the successful transaction. The set of files may be stored in a file system.

In the catalog, a data set item of a data set may be identified by the name or identifier of the data set and the data set version corresponding to the data set item. In a preferred embodiment, the data set version corresponds to an identifier assigned to the transaction that created the data set version. The data set item may be associated in the catalog with the set of files that contain the data of the data set item. In a preferred embodiment, the catalog treats the set of files as opaque. That is, the catalog itself may store paths or other identifiers of the set of files but may not otherwise open, read, or write to the files.

In sum, the catalog may store information about data sets. The information may include information identifying different versions (i.e., different data set items) of the data sets. In association with information identifying a particular version (i.e., a particular data set item) of a data set, there may be information identifying one or more files that contain the data of the particular data set version (i.e., the particular data set item).

The catalog may store information representing a non-linear history of a data set. Specifically, the history of a data set may have different data set branches. Branching may be used to allow one set of changes to a data set to be made independent and concurrently of another set of changes to the data set. The catalog may store branch names in association with data set version identifiers for identifying data set items that belong to a particular data set branch.

The catalog may provide data set provenance at the transaction level of granularity. As an example, suppose a transformation is executed in the data pipeline system 700 multiple times that reads data from data set A, reads data from data set B, transforms the data from data set A and the data from data set B in some way to produce data set C. As mentioned, this transformation may be performed multiple times. Each transformation may be performed in the context of a transaction. For example, the transformation may be performed daily after data sets and B are updated daily in the context of transactions. The result being multiple versions of data set A, multiple versions of data set B, and multiple versions of data set C as a result of multiple executions of the transformation. The catalog may contain sufficient information to trace the provenance of any version of data set C to the versions of data sets A and B from which the version of data set C is derived. In addition, the catalog may contain sufficient information the trace the provenance of those versions of data sets A and B to the earlier versions of data sets A and B from which those versions of data sets A and B were derived.

The provenance tracking ability is the result of recording in the catalog for a transaction that creates a new data set version, the transaction or transactions that the given transaction depends on (e.g., is derived from). The information recorded in the catalog may include an identifier of each dependent transaction and a branch name of the data set that the dependent transaction was committed against.

According to some embodiments, provenance tracking extends beyond transaction level granularity to column level granularity. For example, suppose a data set version A is structured as a table of two columns and a data set version B is structured as a table of five columns. Further assume, column three of data set version B is computed from column one of data set version A. In this case, the catalog may store information reflecting the dependency of column three of data set version B on column one of data set version A.

The catalog may also support the notion of permission transitivity. For example, suppose the catalog records information for two transactions executed against a data set referred to in this example as "Transaction 1" and Transaction 2." Further suppose a third transaction is performed against the data set which is referred to in this example as "Transaction 3." Transaction 3 may use data created by Transaction 1 and data created by Transaction 2 to create the data set item of Transaction 3. After Transaction 3 is executed, it may be decided according to organizational policy that a particular user should not be allowed to access the data created by Transaction 2. In this case, as a result of the provenance tracking ability, and in particular because the catalog records the dependency of Transaction 3 on Transaction 2, if permission to access the data of Transaction 2 is revoked from the particular user, permission to access the data of Transaction 3 may be transitively revoked from the particular user.

The transitive effect of permission revocation (or permission grant) can apply to an arbitrary number of levels in the provenance tracking. For example, returning to the above example, permission may be transitively revoked for any transaction that depends directly or indirectly on the Transaction 3.

According to some embodiments, where provenance tracking in the catalog has column level granularity. Then permission transitivity may apply at the more fine-grained column-level. In this case, permission may be revoked (or granted) on a particular column of a data set and based on the column-level provenance tracking in the catalog, permission may be transitively revoked on all direct or indirect descendent columns of that column.

A build service can manage transformations which are executed in the system to transform data. The build service may leverage a directed acyclic graph data (DAG) structure to ensure that transformations are executed in proper dependency order. The graph can include a node representing an output data set to be computed based on one or more input data sets each represented by a node in the graph with a directed edge between node(s) representing the input data set(s) and the node representing the output data set. The build service traverses the DAG in data set dependency order so that the most upstream dependent data sets are computed first. The build service traverses the DAG from the most upstream dependent data sets toward the node representing the output data set rebuilding data sets as necessary so that they are up-to-date. Finally, the target output data set is built once all of the dependent data sets are up-to-date.

The data pipeline system 700 can support branching for both data and code. Build branches allow the same transformation code to be executed on multiple branches. For example, transformation code on the master branch can be executed to produce a data set on the master branch or on another branch (e.g., the develop branch). Build branches also allow transformation code on a branch to be executed to produce data sets on that branch. For example, transformation code on a development branch can be executed to produce a data set that is available only on the development branch. Build branches provide isolation of re-computation of graph data across different users and across different execution schedules of a data pipeline. To support branching, the catalog may store information represents a graph of dependencies as opposed to a linear dependency sequence.

The data pipeline system 700 may enable other data transformation systems to perform transformations. For example, suppose the system stores two "raw" data sets R1 and R2 that are both updated daily (e.g., with daily web log data for two web services). Each update creates a new version of the data set and corresponds to a different transaction. The data sets are deemed raw in the sense that transformation code may not be executed by the data pipeline system 700 to produce the data sets. Further suppose there is a transformation A that computes a join between data sets R1 and R2. The join may be performed in a data transformation system such a SQL database system, for example. More generally, the techniques described herein are agnostic to the particular data transformation engine that is used. The data to be transformed and the transformation code to transform the data can be provided to the engine based on information stored in the catalog including where to store the output data.

According to some embodiments, the build service supports a push build. In a push build, rebuilds of all data sets that depend on an upstream data set or an upstream transformation that has been updated are automatically determined based on information in the catalog and rebuilt. In this case, the build service may accept a target data set or a target transformation as an input parameter to a push build command. The build service than determines all downstream data sets that need to be rebuilt, if any.

As an example, if the build service receives a push build command with data set R1 as the target, then the build service would determine all downstream data sets that are not up-to-date with respect to data set R1 and rebuild them. For example, if data set D1 is out-of-date with respect to data set R1, then data set D1 is rebuilt based on the current versions of data sets R1 and R2 and the current version of transformation A. If data set D1 is rebuilt because it is out-of-date, then data set D2 will be rebuilt based on the up-to-date version of data set D1 and the current version of transformation B and so on until all downstream data set of the target data set are rebuilt. The build service may perform similar rebuilding if the target of the push build command is a transformation.

The build service may also support triggers. In this case, a push build may be considered a special case of a trigger. A trigger, generally, is a rebuild action that is performed by the build service that is triggered by the creation of a new version of a data set or a new version of a transformation in the system.

A schema metadata service can store schema information about files that correspond to transactions reflected in the catalog. An identifier of a given file identified in the catalog may be passed to the schema metadata service and the schema metadata service may return schema information for the file. The schema information may encompass data schema related information such as whether the data in the file is structured as a table, the names of the columns of the table, the data types of the columns, user descriptions of the columns, etc.

The schema information can be accessible via the schema metadata service may versioned separately from the data itself in the catalog. This allows the schemas to be updated separately from data sets and those updates to be tracked separately. For example, suppose a comma separated file is uploaded to the system as particular data set version. The catalog may store in association with the particular data set version identifiers of one or more files in which the CSV data is stored. The catalog may also store in association with each of those one or more file identifiers, schema information describing the format and type of data stored in the corresponding file. The schema information for a file may be retrievable via the scheme metadata service given an identifier of the file as input. Note that this versioning scheme in the catalog allows new schema information for a file to be associated with the file and accessible via the schema metadata service. For example, suppose after storing initial schema information for a file in which the CSV data is stored, updated the schema information is stored that reflects a new or better understanding of the CSV data stored in the file. The updated schema information may be retrieved from the schema metadata service for the file without having to create a new version of the CSV data or the file in which the CSV data is stored.

When a transformation is executed, the build service may encapsulate the complexities of the separate versioning of data sets and schema information. For example, suppose transformation A described above in a previous example that accepts the data set R1 and data set R2 as input is the target of a build command issued to the build service. In response to this build command, the build service may determine from the catalog the file or files in which the data of the current versions of data sets R1 and R2 is stored. The build service may then access the schema metadata service to obtain the current versions of the schema information for the file or files. The build service may then provide all of identifiers or paths to the file or files and the obtained schema information to the data transformation engine to execute the transformation A. The underlying data transformation engine interprets the schema information and applies it to the data in the file or files when executing the transformation A.

In various implementations, resources stored in databases 426, 420, and/or 428, may be stored as graphs. FIG. 9 illustrates various graphs or graph-like relationships (which may comprise data structures or databases), and various structures that may be used to represent them. The graphs described above can be referred to as a directed graph (e.g., see the graph depicted and described in reference to the dependency graph interface user interface). However, graph 901 is an example of an undirected graph, wherein the numbered fields 0-9 comprise nodes and the lines connecting the nodes represent relationships. Clusters 904 shows example clusters, which may be considered as a set of graphs which may be disjoint. Data structure 903 represents an adjacency list which may be used to represent a graph or cluster, such as graph 901 or cluster 904. Advantageously, adjacency lists, such as data structure 903, allow storing of graphs in memory efficiently, particularly where the graphs are lightly-connected graphs or clusters (e.g. graphs or clusters wherein the number of nodes is high compared to the number of linkages per node). Adjacency lists 903 may also allow for efficient adding and removal of nodes, e.g. as an operation in constant time, as entries related to nodes that are not connected to the added or removed nodes may not need to be accessed. Data structure 902 is an adjacency matrix, which may also be used to represent a graph or cluster, such as graph 901 or cluster 904. Advantageously, adjacency matrices such as data structure 902 may allow for more efficient storage and processing of highly-connected graphs or clusters, e.g. where the number of connections per node is comparable to the number of nodes. Adjacency matrices such as data structure 902 may also allow for more efficient access and processing, particularly vectorized access and processing (e.g. using specialized hardware or processor instructions for matrix math), to the graph or cluster data because each matrix row corresponding to a node may have the same size irrespective of the number of linkages by node. As described here, various data items may be stored, processed, analyzed, etc. via graph-related data structures, which may provide various storage and processing efficiency advantages described. For example, as shown in FIG. 7, advantages of graph-related data structures may include: built to handle high volume, highly connected data; efficient in computing relationship queries than traditional databases, either using adjacency matrices, or adjacency lists; can easily add to the existing structure without endangering current functionality; structure and schema of a graph model can easily flex; new data types and its relationship; evolves in step with the rest of the application and any changing business data requirements; can easily add weights to edges; can use optimal amount of computer memory, etc.

The nodes of the graph may represent different information, such as dependency relationships, data sets, data transformations, or files, for example. The edges of the graph may represent relationships between the nodes. The data corresponding to the graph may be created or updated in various ways, including those described herein, comprising both manual and automatic processes. In some implementations, the data corresponding to the graph in the database may be created and/or interacted with visually through various graphical user interfaces. Advantageously, this allows the user to interact with the data objects by placing, dragging, linking and deleting visual entities on a graphical user interface. The data corresponding to the graph may be converted to a low-level (i.e. node list) representation as well, in some embodiments.

Notification Module

In some embodiments, an alert and/or notification can automatically be transmitted to a user device based on interactions with the resource dependency system. For example, if a particular user runs a search, modifies a project, or performs any particular action that would be relevant for another user, an alert and/or notification can be generated. The alert and/or notification can be transmitted at the time that the alert and/or notification is generated or at some determined time after generation of the alert and/or notification. When received by the user device, the alert and/or notification can cause the device to display the alert and/or notification via the activation of an application on the device (e.g., a browser, a mobile application, etc.). For example, receipt of the alert and/or notification may automatically activate an application on the user device, such as a messaging application (e.g., SMS or MMS messaging application), a standalone application (e.g., a data analysis application), or a browser, for example, and display information included in the alert and/or notification. If the user device is offline when the alert and/or notification is transmitted, the application may be automatically activated when the user device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

General API Module

Various third-parties operate electronic services systems. In some instances, these systems may allow access through Application Programming Interfaces (APIs). Typically, each API requires its own set of information about a data object, such as name, age, and height for a data object representing a person. Advantageously, embodiments of the present disclosure may collect information related to a data object, form API requests in the format and containing the information required by the API of each third-party ("third-party format"), collect responses from the API of each third-party, translate the different results back into a uniform format that facilitates comparison, storage and/or processing ("common format"), and show the results to the user. For example, different third-parties may require different types of information, and in different format; for example, third-party A may require a data object's name and age properties, whereas third-party B may require an a data object's age and height properties but not name.

Advantageously, rather than presenting the user with different third-parties' requests to provide different information repeatedly, the system may retrieve the required information from its database and automatically convert it into the format expected by the third-party. Advantageously, the system may then also convert the individual responses received from each API, which may again be in a third-party-specific format, into a common format that may facilitate comparison by the user. Similarly, various embodiments may use external APIs to access other services.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
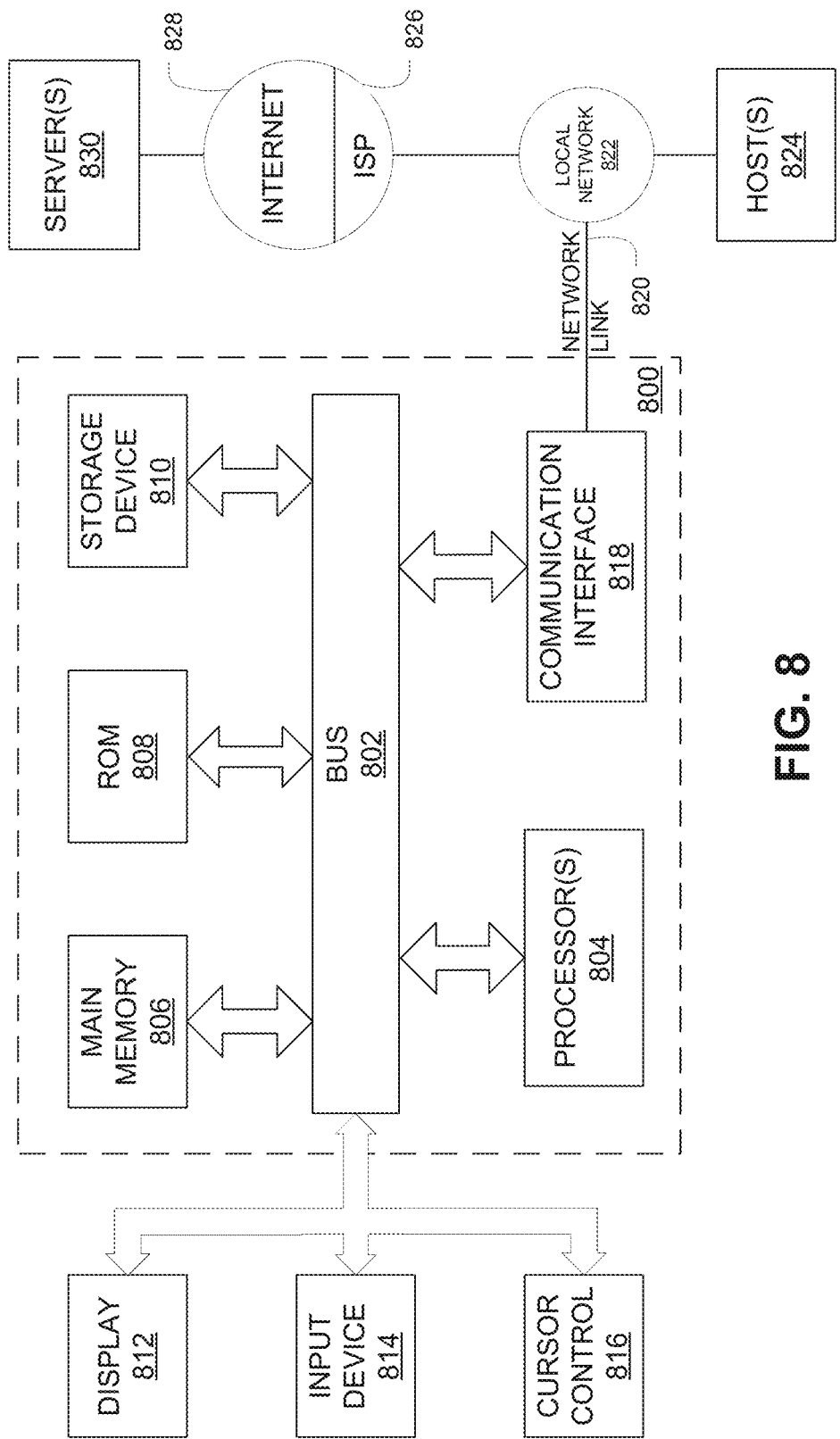
FIG. 8 illustrates a computer system with which certain methods discussed herein may be implemented.

For example, FIG. 8 is a block diagram that illustrates a computer system 800 upon which various embodiments may be implemented. Computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

Various forms of computer readable storage media may be involved in carrying one or more sequences of one or more computer readable program instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer-implemented method comprising:
   receiving, by a folder navigation user interface, a first selection of a first folder location, wherein a first item is located at the first folder location;
   determining related items that comprise a direct or indirect data dependency relationship to the first item;
   based on the determination of the related items, compiling, using data from a subset of the first related items, an Application Programming Interface (API) request configured to be in a data format that is compliant with a first protocol designated by a third party;
   transmitting, to a first server associated with the third party, the API request;
   receiving, from the first server, first results corresponding to the API request; and
   based on the receipt of the first selection and the first results, generating and causing display of a graph user interface that comprises the first item, the first related items, and data corresponding to the first results.

2. The computer-implemented method of claim 1, wherein the first protocol is one of a plurality of protocols.

3. The computer-implemented method of claim 1, further comprising:
   prior to generating and causing display of the graph user interface, translating the first results into a uniform format.

4. The computer-implemented method of claim 1, further comprising:
   further based on the determination of the related items, compiling, using data from a subset of the first related items, a second API request configured to be in a second data format that is compliant with a second protocol different from the first protocol;
   transmitting, to a second server associated with the second third party, the second API request; and
   receiving, from the second server, second results corresponding to the API request, wherein the graph user interface also comprises data corresponding to the second results.

5. The computer-implemented method of claim 4, further comprising:
   prior to generating and causing display of the graph user interface, translate the first results and the second results into a uniform format.

6. The computer-implemented method of claim 1, wherein the API request includes information about a data object, including one or more of: name, age, and height.

7. The computer-implemented method of claim 1, wherein the graph user interface is linked to the folder navigation user interface such that interactions with one user interface affects the other user interface.

8. The computer-implemented method of claim 1, wherein the graph user interface comprises a visual representation of dependency information associated with the first item.

9. The computer-implemented method of claim 1, wherein the graph user interface comprises a directed graph.

10. The computer-implemented method of claim 1, further comprising:
    receiving preprocessing information; and
    based on the receipt of the preprocessing information, causing display of an updated graph user interface that displays one or more items based at least partly on the preprocessing information.

11. The computer-implemented method of claim 10, further comprising:
    querying an external database to retrieve metadata; and
    generating, from the metadata, the preprocessing information.

12. The computer-implemented method of claim 1, wherein the graph user interface is further configured to receive instructions to interact with and modify a view area of the graph user interface.

13. The method of claim 1, further comprising:
    receiving search criteria comprising information about user interfaces that use a data set;
    determining search results associated at least partly on the search criteria; and
    causing display of an updated graph user interface to comprise at least a portion of the determined search results.

14. The method of claim 1, wherein the second folder location is different from the first folder location.

15. A system comprising:
    a computer readable storage medium having program instructions embodied therewith; and
    one or more processors configured to execute the program instructions to cause the system to:

receive, by a folder navigation user interface, a first selection of a first folder location, wherein a first item is located at the first folder location;

determine related items that comprise a direct or indirect data dependency relationship to the first item;

based on the determination of the related items, compile, using data from a subset of the first related items, an Application Programming Interface (API) request configured to be in a data format that is compliant with a first protocol designated by a third party;

transmit, to a first server associated with the third party, the API request;

receive, from the first server, first results corresponding to the API request; and based on the receipt of the first selection and the first results, generate and cause display of a graph user interface that comprises the first item, the first related items, and data corresponding to the first results.

16. The system of claim 15, wherein the first protocol is one of a plurality of protocols.

17. The system of claim 15, wherein the one or more processors are further configured to cause the system to:
prior to generating and causing display of the graph user interface, translate the first results into a uniform format.

18. The system of claim 15, wherein the one or more processors are further configured to cause the system to:
further based on the determination of the related items, compile, using data from a subset of the first related items, a second API request configured to be in a second data format that is compliant with a second protocol different from the first protocol;
transmit, to a second server associated with the second third party, the second API request; and
receive, from the second server, second results corresponding to the API request, wherein the graph user interface also comprises data corresponding to the second results.

19. The system of claim 18, wherein the one or more processors are further configured to cause the system to:
prior to generating and causing display of the graph user interface, translate the first results and the second results into a uniform format.

20. The system of claim 15, wherein the API request includes information about a data object, including one or more of: name, age, and height.

* * * * *